United States Patent Office 3,790,526
Patented Feb. 5, 1974

3,790,526
POLYOLEFIN STABILIZED WITH 3,5-DISUBSTI-
TUTED - 4 - HYDROXYBENZYL ALCOHOL OR
AMINE
Gordon D. Brindell, Crystal Lake, and Rudy F.
Macander, Cary, Ill., assignors to The Quaker Oats
Company, Chicago, Ill.
No Drawing. Filed May 26, 1972, Ser. No. 257,177
Int. Cl. C08f 45/58, 45/60
U.S. Cl. 260—45.85 S                21 Claims

ABSTRACT OF THE DISCLOSURE

Polyolefin normally tending to undergo oxidative deterioration stabilized with a compound of the following formula is disclosed:

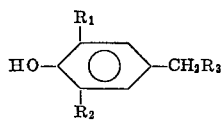

wherein $R_1$ and $R_2$ are independently aralkyl or alkyl with the proviso that at least one aralkyl group contains no branching on the carbon alpha to the phenylene group or at least one alkyl group contains no branching on the carbon alpha to the phenylene group but has at least one branch on the carbon beta to the phenylene group $R_3$ is hydroxy,

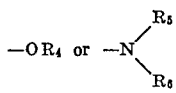

$R_4$, $R_5$, and $R_6$ are alkyl, cycloalkyl, aralkyl, aryl, or alkaryl and $R_6$ may additionally be hydrogen.

BACKGROUND OF THE INVENTION

Field of the invention

This invention relates to polyolefins stabilized with a new class of antioxidants.

Description of the prior art

In U.S. Pats. 2,962,531, 3,043,774 and 3,208,859, T. H. Coffield described compounds of the general formula:

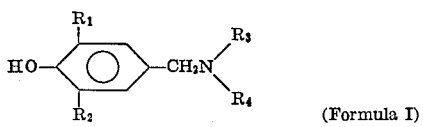
(Formula I)

wherein $R_1$ is an alkyl group containing from 1 to 12 carbon atoms, $R_2$ is an alkyl group containing from 3 to 12 carbon atoms which is branched on the alpha carbon atom, $R_3$ is selected from the group consisting of alkyl, cycloalkyl, aralkyl, aryl, and alkaryl and

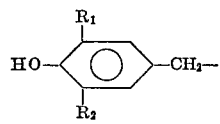

and $R_4$ is selected from the group consisting of hydrogen, alkyl, cycloalkyl, aralkyl, aryl, and alkaryl. These compounds are useful as antioxidants for organic materials.

In U.S. Pats. 2,838,571 and 2,954,345 A. H. Filbey described compounds of the general formula:

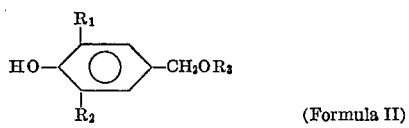
(Formula II)

wherein $R_1$ is an alkyl group containing from 3 to 8 carbon atoms and is branched on the alpha carbon atom, $R_2$ is an alkyl group containing from 1 to 8 carbon atoms, and $R_3$ is selected from the group consisting of alkyl, cycloalkyl, aralkyl and alkenyl. These compounds are useful as antioxidants for organic materials.

SUMMARY OF THE INVENTION

The present invention differs from the prior art in the following ways:

(1) A new class of 3,5-disubstituted-4-hydroxybenzyl derivatives is described wherein at least one of the substituents in the 3,5- position is not branched on the alpha carbon atom but has at least one branch on the beta carbon.

(2) The new class of 3,5-disubstituted-4-hydroxybenzyl derivatives are unexpectedly good antioxidants for polyolefins compared to those derivatives wherein the substituents in the 3,5- positions are branched on the alpha carbon atom.

The invention may be briefly described as a polyolefin stablized with a compound having the following structural formula:

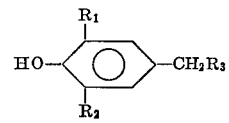
(Formula III)

wherein $R_1$ and $R_2$ are independently aralkyl or alkyl with the proviso that at least one aralkyl group contains no branching on the carbon alpha to the phenylene group or at least one alkyl group contains no branching on the carbon alpha to the phenylene group but has at least one branch on the carbon beta to the phenylene group; $R_3$ is hydroxy,

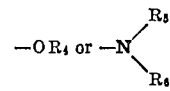

$R_4$, $R_5$, and $R_6$ are alkyl, cycloalkyl, aralkyl, aryl or alkaryl and $R_6$ may additionally be hydrogen.

The present invention may further be described as a process for stabilizing polyolefins which comprises incorporating with said polyolefin from 0.01 percent to 10 percent by weight of a 3,5-disubstituted-4-hydroxybenzyl derivative of Formula III.

Where $R_1$ or $R_2$ are alkyl in Formula III, we mean to include primary, secondary, and tertiary alkyl with the further proviso that at least one of the groups $R_1$ or $R_2$ be a primary alkyl group wherein there is at least one alkyl branch on the carbon in said primary alkyl group beta to the phenylene group to which it is attached or an aralkyl group wherein there is no branching on the carbon alpha to the phenylene group. We prefer that when $R_1$ or $R_2$ is alkyl that the alkyl group contains from 1 to 10 carbon atoms. Of course, where the alkyl group has beta branching, the group must contain at least 4 carbon atoms. When $R_1$ and $R_2$ are alkyl, it is particularly preferred that $R_1$ and $R_2$ both be alkyl groups which are primary and wherein there is no branching on the carbon alpha to the phenylene group but there is at least one alkyl branch on the beta carbon.

When $R_1$ or $R_2$ in Formula III are aralkyl we are to be understood to mean a group of the following structure:

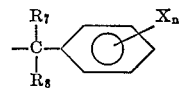

wherein $R_7$ and $R_8$ are hydrogen or alkyl having 1 to 6 carbon atoms; X is alkyl, alkoxy, or halogen, and $n$ is an integer between 0 and 5 inclusive with the further proviso that at least one of the groups $R_1$ or $R_2$ be an aralkyl group wherein there is no alkyl branching on the carbon alpha to the phenylene group or be a primary alkyl group wherein there is at least one alkyl branch on the carbon alpha in said primary alkyl group beta to the phenylene group. We prefer that the aralkyl group contains less than 20 carbon atoms. Where the aralkyl group is substituted with halogen, the halogen group may be chloro, bromo, iodo, or fluoro, for example. Where the aralkyl group is substituted with alkyl or alkoxy groups, these groups preferably contain from 1 to 12 carbon atoms which may be straight or branched chain. Suitable aralkyl groups include the following as long as the above-mentioned proviso is satisfied: benzyl, styryl, ar-chlorobenzyl, ar-bromobenzyl, ar-iodobenzyl, ar-fluorobenzyl, ar-methoxybenzyl, ar-ethoxybenzyl, ar-methylbenzyl, ar-ethylbenzyl, or ar-tert-butylbenzyl.

In the compound of Formula III it is preferable that the hydrocarbon radicals of the groups designated above as $R_3$ and $R_4$ contain the following ranges of carbon atoms: alkyl, 1 to 12; cycloalkyl, 5 to 6; aralkyl, 7 to 11; aryl, 6 to 10; and alkaryl, 7 to 15. The alkyl, cycloalkyl, aralkyl, and alkaryl groups may be straight or branched chain. It is particularly preferred that both $R_1$ and $R_2$ be aralkyl groups wherein there is no alkyl branching on the carbon alpha to the phenylene group.

Examples of specific 3,5-disubstituted-4-hydroxybenzyl derivatives within the scope of Formula III and useful in the practice of this invention are the following:

N,N-dimethyl-3-methyl-5-isobutyl-4-hydroxybenzylamine;
N,N-dimethyl-3-ethyl-5(2'-methylbutyl)-4-hydroxybenzylamine;
N,N-dimethyl-3-isopropyl-5(2'-methylpentyl)-4-hydroxybenzylamine;
N,N-dimethyl-3-tert-butyl-5(2'-ethylhexyl)-4-hydroxybenzylamine;
N,N-diethyl-3-ethyl-5(2'-methylbutyl)-4-hydroxybenzylamine;
N-cyclohexyl-3-isopropyl-5(2'-methylpentyl)-4-hydroxybenzylamine;
N-benzyl-3-tert-butyl-5(2'-ethylhexyl)-4-hydroxybenzylamine;
N-phenyl-3-methyl-5-isobutyl-4-hydroxybenzylamine;
N-3,5-xylyl-3-ethyl-5(2'-methylbutyl)-4-hydroxybenzylamine;
N-p-butylbenzyl-3-isopropyl-5(2'-methylpentyl)-4-hydroxybenzylamine;
N-α-naphthyl-3-tert-butyl-5(2'-ethylhexyl)-4-hydroxybenzylamine;
N-p-tolyl-3-ethyl-5(2'-methylbutyl)-4-hydroxybenzylamine;
3,5-diisobutyl-4-hydroxybenzyl alcohol;
3,5-di(2'-methylbutyl)-4-hydroxybenzyl alcohol;
3,5-di(2'-ethylbutyl)-4-hydroxybenzyl alcohol;
3,5-di(2'-ethylhexyl)-4-hydroxybenzyl alcohol;
3,5-dibenzyl-4-hydroxybenzyl alcohol;
3,5-di-o-chlorobenzyl-4-hydroxybenzyl alcohol;
3,5-di-p-chlorobenzyl-4-hydroxybenzyl alcohol;
3,5-di-p-methylbenzyl-4-hydroxybenzyl alcohol;
3,5-di-p-methoxybenzyl-4-hydroxybenzyl alcohol;
3,5-diisobutyl-4-hydroxybenzyl ethyl ether;
3,5-di(2'-methylbutyl)-4-hydroxybenzyl ethyl ether;
3,5-di(2'-ethylbutyl)-4-hydroxybenzyl ether ether;
3,5-dibenzyl-4-hydroxybenzyl methyl ether;
3,5-di-o-chlorobenzyl-4-hydroxybenzyl methyl ether;
3,5-di-p-chlorobenzyl-4-hydroxybenzyl methyl ether;
3,5-di-p-ethylbenzyl-4-hydroxybenzyl isopropyl ether;
3,5-di-p-ethoxybenzyl-4-hydroxybenzyl ethyl ether;

and the like.

The 3,5-disubstituted-4-hydroxybenzyl alcohols of Formula III are prepared by contacting (1) a 2,6-disubstituted phenol in which the substituents conform with the groups designated $R_1$ and $R_2$, (2) formaldehyde, and (3) a sterically hindered monohydric alcohol such as isopropyl alcohol in the presence of a catalytic quantity of a metallic hydroxide condensation catalyst, said metallic hydroxide being a metal selected from the group consisting of alkali and alkaline earth metals.

The 3,5-disubstituted-4-hydroxybenzyl ethers of Formula III are prepared by contacting (1) a 2,6-disubstituted phenol in which the substituents conform with the groups designated $R_1$ and $R_2$, (2) formaldehyde, and (3) a monohydric alcohol which conforms with the requirements of the group $-OR_4$ designated above, in the presence of a catalytic quantity of a metallic hydroxide condensation catalyst, said metallic hydroxide being a metal selected from the group consisting of alkali and alkaline earth metals. Suitable preparations are described in U.S. Pat. 2,838,571 and in the following examples.

The 3,5-disubstituted-4-hydroxybenzylamine of Formula III are prepared by contacting (1) a 2,6-disubstituted phenol in which the substituents conform with the groups designated $R_1$ and $R_2$, (2) formaldehyde, and (3) a primary or secondary amine which conforms with the requirements of the group

designated above. In conducting this process a monohydric alcohol containing from 1 to 6 carbon atoms is preferably used as the reaction solvent. A typical preparation is set forth by way of example below. Other suitable preparations are described in U.S. Pat. 2,962,531.

The term "polyolefin" as used herein means those polymers derived from monoolefins and is intended to include those polymers commonly referred to as "acrylics." Examples of such polymers are polyethylene, polypropylene, polystyrene, polyvinyl chloride, polyvinylidene chloride, polyvinyl fluoride, polyvinyl butyral, polymethyl acrylate, ethylenevinyl acetate copolymers, and ethylene-propylene terpolymers.

In general, the 3,5-disubstituted-4-hydroxybenzyl derivatives of Formula III should be used with the polyolefin to be stabilized in an amount effective and sufficient to stabilize the material. The requisite amount will, of course, depend both on the efficiency of the particular 3,5-disubstituted-4-hydroxybenzyl derivative, and on the nature of the polyolefin in which it is employed. It has been our experience that from 0.01 percent to 10 percent by weight based on the weight of the polyolefin is sufficient. Amounts down to as little as 0.0001 percent by weight may be effective in some cases.

It is to be understood that the stabilizing effect of the 3,5-disubstituted-4-hydroxybenzyl derivatives of Formula III is considerably enhanced by conventional synergists such as certain sulfides and polysulfides. The synergist is used in conventional amounts. For example an amount of synergist from about 0.1 percent to about 1 percent by weight of the polyolefin to be stabilized is satisfactory but we prefer to use from 0.1 percent to 0.5 percent by weight.

As sulfides there may be mentioned dialkylsulfides, particularly wherein the alkyl groups are long chain such as dodecyl groups since the lower dialkylsulfides are too volatile to be effective, di(substituted alkyl) particularly esters of bis-carboxyalkyl sulfides such as dilauryl, distearyl, ditridecyl, or dioctadecyl thiodipropionates or thiodibutyrates, dibenzylsulfides such as bis-(2-hydroxy-5-methylbenzyl)sulfide and bis(3-tert-butyl-2-hydroxy-5-methoxybenzyl)sulfide, diaryl sulfide, sulfides such as diphenyl sulfide, dicresyl sulfide, 2,2¹-di-hydroxy-5,5'-dimethyl diphenyl, diphenyldisulfide, dialkyldithiophosphates such as bis(diisopropyldithiophosphoryl)disulfide, and dialkyldithiophosphatomethylphenols.

It will further be understood that the polyolefin in addition to containing a stabilizing amount of 3,5-disubstituted-4-hydroxybenzyl derivative of Formula III and a synergist may contain such other ingredients as other antioxidants, coloring agents, etc.

DESCRIPTION OF THE PREFERRED EMBODIMENTS

The following embodiments of this invention are shown for the purpose of illustrating the invention and demonstrate the best mode for practicing the invention. It will be apparent to those skilled in the art that various changes and modifications may be made therein without departing from the spirit and scope of the invention as it is more precisely defined in the subjoined claims.

Example 1

In a 1000-ml., 3-neck flask equipped with a condenser, thermometer, and dropping funnel 42 g. of 2,6-diisobutylphenol, 200 ml. of ethanol and 62 g. of dimethylamine was placed and cooled to 8° C. Through the dropping funnel 30 g. of a formaldehyde solution (37 percent by weight of formaldehyde in water) was added to the flask over a period of 15 minutes. The contents of the flask was maintained at reflux for 7 hours.

The ethanol was stripped from the reaction mixture, then the product was dissolved in benzene and extracted with water. The benzene phase was dried with magnesium sulfate and then the benzene stripped from the product to yield an oily residue which was crude, N,N-dimethyl-3,5-diisobutyl-4-hydroxybenzylamine.

The product was dissolved in 800 ml. of n-hexane and contacted with sufficient hydrochloric acid to form the amine salt. The n-hexane was decanted. The salt dissolved in methylene dichloride, and then extracted with a solution of 8 g. of sodium hydroxide in water. The product which was in the methylene dichloride layer was dried with magnesium sulfate. The methylene dichloride was vacuum distilled from the purified product.

Example 2

Following the procedure of Example 1 except that 2,6-di(2'-ethylhexyl)phenol was substituted for the 2,6-diisobutylphenol, N,N-dimethyl-3,5-di(2'-ethylhexyl)-4-hydroxybenzylamine was prepared.

Example 3

In the reaction equipment of Example 1, 10.3 g. of 3,5-diisobutylphenol, 2.1 g. of a formaldehyde solution (37 percent by weight of formaldehyde in water), 20.0 ml. of isopropyl alcohol, and 0.3 g. of potassium hydroxide were placed and the contents of the flask maintained at a temperature between 35-40° C. for 3 hours while being stirred continuously.

The product was dissolved in n-hexane and extracted with water. The water phase was separated leaving the n-hexane phase containing the product. The n-hexane phase was cooled and the product separated by filtration. The crystalline product was further washed with cold n-hexane. The purified product was 3,5-diisobutyl-4-hydroxybenzyl alcohol having a melting point of 82–90° C.

Example 4

The performance of several 3,5-disubstituted-4-hydroxybenzyl derivatives as an antioxidant for polypropylene was determined in the following tests:

In Test 1 an 80 g. sample of Hercules Pro-Fax 6501 polypropylene powder was admixed in a Brabender Plasticorder in which the mixing chamber was heated to about 200° C. The material was mixed for 5 to 10 minutes until the polypropylene had a workable consistency. A sample of the material was then removed and molded into a 5 mil film. One inch diameter circles of the film were cut out and put into an oven maintained at 140° C. After 1 hour in the oven, the sample crumbled.

In Test 2, 0.24 g. of dilaurylthiodipropionate was mixed with the 80 g. of polypropylene powder and a sample tested for heat aging as in Test 1. The sample lasted for 70 hours before it crumbled.

TABLE I

| Test No. | Antioxidant | Synergist | Hours before crumbling |
|---|---|---|---|
| 1 | 0 | No | 1 |
| 2 | 0 | Yes | 70 |
| 3 | 2,6-di-tert-butyl-4-hydroxybenzyl alcohol | No | 3 |
| 4 | do | Yes | 211 |
| 5 | 2,6-diisobutyl-4-hydroxybenzyl alcohol | No | 8 |
| 6 | do | Yes | 571 |
| 7 | N,N-dimethyl-3,5-di-tert-butyl-4-hydroxybenzylamine | No | 5 |
| 8 | do | Yes | 268 |
| 9 | N,N-dimethyl-3,5-diisobutyl-4-hydroxybenzylamine | No | 16 |
| 10 | do | Yes | 403 |
| 11 | N,N-dimethyl-3,5-di(2'-ethylhexyl)-4-hydroxybenzylamine | No | 16 |
| 12 | do | Yes | 595 |

The above samples clearly demonstrate the accomplishment of this invention. Examples 1–3 inclusive demonstrate our preferred method for obtaining the 3,5-disubstituted-4-hydroxybenzyl derivatives of Formula III.

In Example 4 a comparison of Test 5 with Test 3 and more particularly Test 6 with Test 4 clearly demonstrates the superiority of the 3,5-disubstituted-4-hydroxybenzyl alcohols of Formula III as antioxidants in polyolefins over the conventional antioxidant 3,5-di-tert-butyl-4-hydroxybenzyl alcohol.

A comparison of Test 9 and 11 with Test 7 and more particularly Test 10 and 12 with Test 8 clearly demonstrates the superiority of the 3,5-disubstituted-4-hydroxybenzylamines of Formula III as antioxidants in polyolefins over the known antioxidant 3,5-di-tert-butyl-4-hydroxybenzylamine. Tests 1, 2, 3, 4, 7, and 8 are not embodiments of our invention but were prepared for the purposes of comparison with the results from use with the 3,5-disubstituted-4-hydroxybenzyl derivatives of Formula III.

3,5-di-substituted-4-hydroxybenzyl methyl ether of Formula III were compared with 3,5-di-tert-butyl-4-hydroxybenzyl methyl ether and were also found to be superior antioxidants, particularly in the presence of conventional sulfide synergists, for polypropylene.

From the foregoing description we consider it to be clear that the present invention contributes a substantial benefit to the antioxidant art by providing a new and useful antioxidant for polyolefins.

We claim:

1. A polyolefin polymer normally tending to undergo oxidative deterioration in the presence of air or oxygen said polymer being selected from the group polyethylene and polypropylene, said polymer containing an effective amount of a composition having the formula:

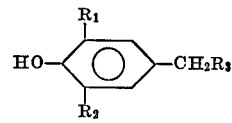

wherein $R_1$ and $R_2$ are independently aralkyl or alkyl with the proviso that at least one aralkyl group contains no branching on the carbon alpha to the phenol phenylene group but has at least one branch on the carbon beta to the phenol phenylene group, or that at least one alkyl group contains no branching on the carbon alpha to the phenol phenylene group but has at least one branch on the carbon beta to the phenol phenylene group; wherein the alkyl has one to ten carbons and wherein the aralkyl has the structure

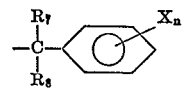

containing less than 20 carbons, and wherein $R_7$ and $R_8$ are hydrogen or alkyl having one to six carbon atoms and wherein X is hydrogen, halogen, or alkyl or an alkoxy wherein the alkyl and alkoxy contain from one to twelve carbon atoms, and $n$ is an integer between 0 and 5 inclusive; wherein $R_3$ is hydroxy, or

$R_4$, $R_5$ and $R_6$ are alkyl, cycloalkyl aralkyl, aryl or alkaryl and $R_6$ may additionally be hydrogen, and wherein hydrocarbon radicals in $R_3$ contain the following range of carbon atoms: alkyl, 1 to 12; cycloalkyl, 5 to 6; aralkyl, 7 to 11; aryl, 6 to 12; and alkaryl, 7 to 12.

2. The composition of claim 1 wherein the $R_1$ and $R_2$ are aralkyl groups having less than 20 carbon atoms and the formula:

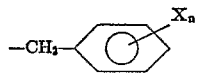

wherein X is alkyl, alkoxy, or halogen and $n$ is an integer between 0 and 5 inclusive; and wherein $R_3$ is

3. The composition of claim 1 wherein $R_1$ and $R_2$ are alkyl groups containing from 4 to 10 carbon atoms.

4. The composition of claim 1 wherein the polyolefin is polyethylene.

5. The composition of claim 1 wherein the composition of the formula is present in an amount from 0.01 percent to 10 percent by weight based on the weight of the polyolefin.

6. The composition of claim 1 which also includes an effective amount of a sulfide synergist, selected from the group di(substituted alkyl)sulfides, and di aryl sulfides.

7. The composition of claim 6 wherein the composition of the formula is 3,5-diisobutyl-4-hydroxybenzyl alcohol.

8. The composition of claim 6 wherein the composition of the formula is N,N-dimethyl-3,5-diisobutyl-4-hydroxybenzylamine.

9. The composition of claim 6 wherein the composition of the formula is N,N-dimethyl-3,5-di(2'-ethylhexyl)-4-hydroxybenzylamine.

10. The composition of claim 6 wherein the composition of the formula is 3,5-dibenzyl-4-hydroxybenzyl alcohol.

11. The composition of claim 1 wherein a dialkyl thiodialkanoate is present as a synergist.

12. Polypropylene containing an effective antioxidant amount of a composition having the formula:

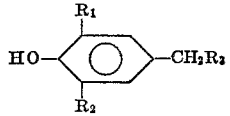

wherein $R_1$ and $R_2$ are independently aralkyl or alkyl with the proviso that the aralkyl group contains no branching on the carbon alpha to the phenol phenylene but has at least one branch on the carbon beta to the phenol phenylene group and the alkyl group contains no branching on the carbon alpha to the phenol phenylene group but has at least one branch on the carbon beta to the phenol phenylene group; wherein the alkyl has one to ten carbons and wherein the aralkyl has the structure

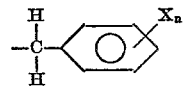

containing less than 20 carbons, and wherein X is hydrogen, halogen, or alkyl or an alkoxy wherein the alkyl and alkoxy contain from one to twelve carbon atoms, and $n$ is an integer between 0 and 5 inclusive; wherein $R_3$ is hyhydroxy, or

wherein $R_4$, $R_5$ and $R_5$ are alkyl, cycloalkyl, aralkyl, aryl or alkaryl and $R_6$ may additionally be hydrogen, and wherein hydrocarbon radicals in $R_3$ contain the following range of carbon atoms: alkyl, 1 to 12; cycloalkyl, 5 to 6; aralkyl, 7 to 11; aryl, 6 to 12; and alkaryl, 7 to 12.

13. The composition of claim 12 wherein the $R_1$ and $R_2$ are aralkyl groups having less than 20 carbon atoms and the formula:

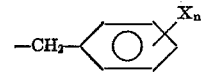

wherein X is alkyl, alkoxy, or halogen and $n$ is an integer between 0 and 5 inclusive; and wherein $R_3$ is

14. The composition of claim 12 wherein $R_1$ and $R_2$ are alkyl groups containing from 4 to 10 carbon atoms.

15. The composition of claim 12 wherein the composition of the formula is present in an amount from 0.01 percent to 10 percent by weight based on the weight of the polypropylene.

16. The composition of claim 12 which contains an effective amount of a sulfide synergist, selected from the group di(substituted alkyl)sulfides, and di aryl sulfides.

17. The composition of claim 12 wherein a dialkyl thiodialkanoate is present as a synergist.

18. The composition of claim 12 wherein the composition of the formula is 3,5-diisobutyl-4-hydroxy-benzyl alcohol.

19. The composition of claim 12 wherein the composition of the formula is N,N-dimethyl-3,5-diisobutyl-5-hydroxybenzylamine.

20. The composition of claim 12 wherein he composition of the formula is N,N-dimethyl-3,5-di(2'-ethyl-hexyl)-4-hydroxybenzylamine.

21. The composition of claim 20 wherein the composition of the formula is 3,5-dibenzyl-4-hydroxybenzyl alcohol.

References Cited
UNITED STATES PATENTS

| | | | |
|---|---|---|---|
| 2,962,531 | 11/1960 | Coffield | 252—403 |
| 3,549,587 | 12/1970 | Nicholson et al. | 260—45.95 |
| 3,085,003 | 4/1963 | Morris | 260—45.95 |
| 3,095,378 | 6/1963 | Watson | 252—404 |
| 2,838,571 | 6/1958 | Filbey | 252—404 |
| 2,730,436 | 1/1956 | Young et al. | 252—404 |
| 3,692,691 | 9/1972 | Meltsner | 252—404 |

OTHER REFERENCES

Industrial & Engineering Chemistry Product Research and Development, vol. 1, No. 4, December 1962, pp. 236–241.

DONALD E. CZAJA, Primary Examiner

V. P. HOKE, Assistant Examiner

U.S. Cl. X.R.

260—45.7 S, 45.9 R, 45.95 G, 45.95 H

UNITED STATES PATENT OFFICE
CERTIFICATE OF CORRECTION

Patent No. 3,790,526　　　　　　　　Dated　February 5, 1974

Inventor(s)　Gordon D. Brindell and Rudy F. Macander

It is certified that error appears in the above-identified patent and that said Letters Patent are hereby corrected as shown below:

In Claim 21, "Claim 20" should read --Claim 16--.

Signed and sealed this 7th day of May 1974.

(SEAL)
Attest:

EDWARD M.FLETCHER,JR.　　　　　　　　C. MARSHALL DANN
Attesting Officer　　　　　　　　　　Commissioner of Patents